United States Patent Office 2,888,412
Patented May 26, 1959

2,888,412

FLEXIBLE ELASTOMERIC CELLULAR MATERIAL AND METHOD OF MAKING SAME

Newell R. Bender, Cuyahoga Falls, Ohio, assignor to The Goodyear Tire & Rubber Company, Akron, Ohio, a corporation of Ohio No Drawing. Application December 21, 1955
Serial No. 554,407

6 Claims. (Cl. 260—2.5)

This invention relates to flexible elastomeric cellular materials. More particularly, it relates to flexible, elastomeric, cellular structures prepared from liquid reaction mixtures containing polyisocyanates and to methods for their preparation.

The production of flexible cellular structures from liquid polymeric reaction mixtures containing polyisocyanates is a comparatively recent development. The reaction mixtures from which the cellular structures are made contain polymeric materials which are either liquid at room temperature or capable of being melted at relatively low temperatures. The polymeric material contains active-hydrogen atoms which react with the isocyanate groups to form a network of crosslinked molecular chains. The polyisocyanate not only functions as a chain extender and crosslinker or curative for the polymeric material, but also reacts with water and carboxyl groups present in the liquid reaction mixture to generate carbon dioxide which causes the liquid reaction mixture to expand and foam. A flexible elastomeric cellular structure is formed which retains its foamed cellular character after the polymer has been crosslinked or cured.

Examples of the active-hydrogen-containing polymeric materials useful in the practice of this invention are polyesters, polyesteramides, polyalkylene ether glycols, and mixtures of two or more of these. By the term "active-hydrogen" used to describe these polymeric materials is meant those hydrogen atoms which are reactive as measured and determined by the Zerewitinoff method. The polyesters referred to are prepared by the condensation reaction between one or more glycols and one or more dibasic carboxylic acids. The polyesteramides are prepared from one or more glycols, one or more dibasic carboxylic acids and relatively small amounts of one or more bifunctional amino compounds, such as amino carboxylic acids, amino alcohols, or diamines. Small amounts of trifunctional materials may optionally be employed in preparing the active-hydrogen-containing polyesters and polyesteramides. The polyalkylene ether glycols which may be used are hydroxyl-terminated polyethers derived from alkylene oxides or glycols or from heterocyclic ethers, such as dioxolane. Further examples of these active-hydrogen-containing polymeric materials and methods for their preparation are described in United States Patents 2,625,531; 2,625,532; and 2,625,535 which show polyesters and polyesteramides and United States Patents 2,692,873 and 2,702,797 which show the polyalkylene ether glycols. Preferred active-hydrogen-containing polymeric materials useful in the practice of this invention are the polyesters and polyesteramides having an average molecular weight of from approximately 1,000 to 5,000, an acid number not greater than 5, and a hydroxyl number from 20 to 110. Best results are obtained with polyesters having an acid number not greater than 2, a hydroxyl number of approximately 60, and an average molecular weight of approximately 2,000.

Any organic polyisocyanate or mixtures of polyisocyanates may be employed. The amount of polyisocyanate should be at least sufficient to cross-link the active-hydrogen-containing polymeric material and to react with the water present to generate carbon dioxide gas. In general it is preferred to use from 2 to 8 equivalents of isocyanate per mol of polymeric material with best results being obtained by the use of approximately 3 mols of a diisocyanate per mol of polymeric material. Representative examples of polyisocyanates which may be employed are the diisocyanates such as hexamethylene diisocyanate; para-phenylene diisocyanate; meta-phenylene diisocyanate; 4,4'-diphenylene diisocyanate; 1,5-naphthalene diisocyanate; 4,4'-diphenylene methane diisocyanate; the tolylene diisocyanates; 4,4'-diphenyl ether diisocyanate; 3,3'-dimethyl 4,4'-diphenyl diisocyanate; and 3,3'-dimethoxy 4,4'-diphenyl diisocyanate; the triisocyanates such as 4,4',4''-triphenyl methane triisocyanate; and toluene 2,4,6 triisocyanate; the tetraisocyanates such as 4,4'-dimethyl-diphenyl methane 2,2',5,5' tetraisocyanate and mixtures of polyisocyanates such as those described in U.S. Patent 2,683,730. Of these the tolylene diisocyanates, such as 2,4 tolylene diisocyanate and 2,6 tolylene diisocyanate and toluene 2,4,6 triisocyanate are particularly preferred.

The water in the reaction mixture is provided to generate the carbon dioxide gas for foaming as well as to form possible points for cross-linking the polymeric material. In addition to the three essential ingredients (polymer, polyisocyanate and water) the reaction mixture may optionally contain pigment fillers, reinforcing agents, coloring agents, antioxidants, and catalysts.

It is the broad object of this invention to provide flexible elastomeric cellular reaction products having improved properties from reaction mixtures containing water, polyisocyanate, and the active-hydrogen-containing polymeric materials discussed above. It is another object to provide flexible elastomeric cellular reaction products having increased compression or resistance to deflection under load. Still another object is to provide more resilient cellular reaction products which snap back to their original shape more readily when a deforming load or stress is removed. Other objects will appear as the description proceeds.

The objects of this invention are achieved by employing in the liquid reaction mixture, along with the water and polyisocyanate, from 1 to 10 parts by weight of castor oil per 100 parts by weight of the active-hydrogen-containing polymeric material. Best results are obtained by forming the flexible elastomeric cellular reaction products from the polymeric material, water, polyisocyanate and approximately 2 parts by weight of castor oil per 100 parts by weight of polymeric material.

The practice of this invention is illustrated with respect to the following examples in which, unless otherwise specified, parts are shown by weight.

PREPARATION OF CONTROL MIXTURES

A polyester (800 parts) prepared from approximately 80 mol percent ethylene glycol, 20 mol percent of propylene glycol and adipic acid and having an hydroxyl number of 56.2 and an acid number of 0.2 was mixed with 7.5 parts of water and 6 parts of a catalyst, a condensation product prepared from approximately 4 mols of butyraldehyde and 1 mol of butylamine.

*Example 1*

To 100 parts of the control mixture prepared as described above was added 28 parts of 2,4-tolylene diisocyanate.

*Example 2*

To 100 parts of the control mixture prepared as described above were added 28 parts of 2,4-tolylene diisocyanate and 2.35 parts of castor oil.

Example 3

To 100 parts of the control mixture prepared as described above were added 30.25 parts of 2,4-tolylene diisocyanate and 2.35 parts of castor oil.

Each of the mixtures prepared according to Examples 1 through 3 were thoroughly mixed, and, as the foaming reaction began, the individual mixtures were poured into molds and cured for 30 minutes in a 70° C. air oven. Samples from each of the cured materials were tested for physical properties, the results of these physical properties being reported in Table I below in which density is reported in pounds per cubic foot, tensile strength in pounds per square inch, elongation in percent increase in length at break, compression in pounds required to compress a 50 square inch sample of the cellular material 25% of its original thickness.

Table I

| Example | Density | Tensile Strength | Elongation | Compression |
|---|---|---|---|---|
| 1 | 4.36 | 16 | 95 | 22.8 |
| 2 | 4.88 | 18 | 145 | 30.2 |
| 3 | 4.98 | 16.3 | 100 | 44 |

It is apparent from the test results reported in Table I that Examples 2 and 3 which contain castor oil have higher compression values than Example 1 which contains no castor oil. This increase in compression without a corresponding increase in density is significant because such cellular material is normally sold at a price determined by the compression-density ratio with higher compression values at a given density being preferred. It was also observed by twisting a corner of a sample cut from Examples 1, 2, and 3 that Examples 2 and 3 containing the castor oil returned to their original shape more rapidly than did Example 1 which contained no castor oil.

While certain representative embodiments and details have been shown for the purpose of illustrating the invention, it will be apparent to those skilled in this art that various changes and modifications may be made therein without departing from the spirit or scope of the invention.

I claim:

1. The flexible elastomeric cellular products resulting from the reaction of a mixture containing (A) approximately 1 mol of an active-hydrogen-containing polymeric material having an average molecular weight of from 1000 to 5000, said material being selected from the group consisting of polyalkylene ether glycols, polyesters prepared from at least one glycol and at least one dicarboxylic acid and polyesteramides prepared from at least one glycol, at least one dicarboxylic acid and at least one amino compound selected from the group consisting of amino carboxylic acids, amino alcohols and diamines, said polyesters and polyesteramides having an acid number not greater than 5, (B) approximately 3 mols of an organic diisocyanate, (C) approximately 1 mol of water, and (D) from 1 to 10 parts by weight of castor oil per 100 parts by weight of said polymeric material.

2. Flexible elastomeric cellular reaction products defined by claim 1 in which the polyisocyanate is 2,4-tolylene diisocyanate.

3. Flexible elastomeric cellular reaction products defined by claim 1 in which the amount of castor oil used is approximately 2 parts by weight per 100 parts by weight of the polymeric material.

4. Flexible elastomeric cellular reaction products defined by claim 1 in which the active-hydrogen-containing polymeric material is a polyester prepared from at least one glycol and at least one dibasic carboxylic acid.

5. Flexible elastomeric cellular reaction products defined by claim 4 in which the polyester has an average molecular weight of approximately 2,000 and an acid number not greater than 2.

6. The method for preparing a flexible elastomeric cellular product which comprises forming a reaction mixture containing (A) approximately 1 mol of an active-hydrogen-containing polymeric material having an average molecular weight of from 1000 to 5000, said material being selected from the group consisting of polyalkylene ether glycols, polyesters prepared from at least one glycol and at least one dicarboxylic acid and polyesteramides prepared from at least one glycol, at least one dicarboxylic acid and at least one amino compound selected from the group consisting of amino carboxylic acids, amino alcohols and diamines, said polyesters and polyesteramides having an acid number not greater than 5, (B) approximately 3 mols of an organic diisocyanate, (C) approximately 1 mol of water and (D) from 1 to 10 parts by weight of castor oil per 100 parts by weight of said polymeric material, and permitting said reaction mixture to foam and cure.

References Cited in the file of this patent

UNITED STATES PATENTS

| | | |
|---|---|---|
| 2,358,475 | Pratt | Sept. 19, 1944 |
| 2,609,349 | Cass | Sept. 2, 1952 |
| 2,642,403 | Simon et al. | June 16, 1953 |
| 2,788,335 | Barthel | Apr. 9, 1957 |

OTHER REFERENCES

Chemical Engineering, volume 57, Issue No. 4, April 1950, pages 165–166.